Patented Oct. 16, 1934

1,977,345

UNITED STATES PATENT OFFICE 1,977,345

WOOD STAIN

Charles G. Moore, Lakewood, and Milton Zucker, Cleveland, Ohio, assignors to The Glidden Company, Cleveland, Ohio, a corporation of Ohio No Drawing. Application October 31, 1929, Serial No. 403,909

1 Claim. (Cl. 134—48)

In the old varnish system of wood finishing, the staining of the wood was a relatively simple matter. Benzol-soluble dyes (which can be made sufficiently light-resistant for furniture work and the like) were mixed to the desired shade, and applied. These readily dried, and the pores of the wood were then filled with a filler composition consisting of pigment mixed with oil, drier and aliphatic hydrocarbon thinners. The varnish coats which were then successively applied also contained aliphatic hydrocarbons or turpentine. In no case was a solvent for the dye present in the top coats, and the dye thus remained in the wood and no trouble was encountered. With the advent of wood lacquers however, a new series of solvents came into use, including alcohols, esters and the aromatic hydrocarbons, benzol, toluol and xylol. The use of such lacquers over the old type of stains was found to result in some of the dye leaving the wood and going into solution in the top coating. This produced two bad effects. In mixed color stains, the dyes often tended to bleed unevenly into the lacquer coating, thereby resulting in a change of color; and the acid in the benzol dyes often rotted the lacquer film, destroying its toughness and adhesion. Water-soluble acid dyes, which had been used to a limited extent on very high grade varnish work were next brought into use in this connection. These colors (of the diazo type for the greatest part) have a relatively good resistance to the action of light, and do not tend to bleed into the lacquer film. These stains however, have a very serious disadvantage, which has prevented their more general use. When water or an aqueous solution is applied to wood, it is absorbed and the fiber of the wood is raised. For the filling operation, which follows the staining, unless the wood is perfectly smooth, the filler does not wipe off well and gray marks are left in the uneven portions of the wood where pigment has covered the stain. The fibers raised by the water must therefore be sanded down. In order to do this properly, a wash coat of shellac (about one-half pound per gallon of alcohol) must be applied. This stiffens the wood fibers so that the sandpaper will cut them easily and evenly; but it can be readily seen that this extra shellacking and sanding requires such labor and time that water soluble stains have not been used to much extent in varnish work, notwithstanding their generally desirable qualities, although in lacquer work they were the only usable material.

In accordance with our present invention, the desirable features of water soluble stains however may be made available without objectionably raising the fiber of the wood, and at the same time an organic type of solvent may be employed. Organic solvents which are not anhydrous or which have a small water content have a general advantage also in that since their preparation does not necessitate the elimination of all water, they are commercially available very widely and at comparatively reasonable cost. Ordinary alcohol for instance, which carries about five per cent. of water, but which however tends to raise the fiber of wood if applied as a solvent base, may in accordance with the present invention be so controlled as to avoid fiber-raising action, and operate with the highly desirable water-soluble type of dyes. In order to use water-soluble dyes, it is necessary to get them into solution, as they are at best only slightly soluble in alcohol. The glycols and glycerol are fairly good solvents for these dyes, but their use presents a serious difficulty. About seven to ten per cent. of these materials is needed to keep the alcohol from raising the grain of the wood, and when this much is used, a greasy residue is left on the wood which is hygroscopic and picks up water thus in turn tending to raise the fiber of the wood. The ethers of glycerol and of the higher glycols present the same difficulty. We have however discovered that in such combinations, a desirable control may be had by incorporating a miscible anhydrous solvent which evaporates more slowly than the alcohol, and fiber-raising may be prevented. The ethers of ethylene glycol are desirable in this connection. The ethylene glycol ethers may be used with ethyl alcohol or methanol; but we prefer to add two to five per cent, of one of the higher ethers, or of glycol, in order to further increase the solubility of the dyes in the final material. In general, the ethylene glycol ethers may be employed in amounts of ten to forty per cent. Alcohol, ethyl or methyl, or both, may, as the main constituent, be employed in amounts of from sixty to eighty-five per cent.

As illustrative of the invention, the following examples may be noted:

I. A preferred embodiment of the invention may involve

| | Parts by weight |
|---|---|
| Water soluble dye | 4 |
| Glycol | 2 |
| Methyl ether of ethylene glycol | 28 |
| Alcohol | 70 |

This is an excellent composition in operation, being free from fiber raising generally, and having sufficient solvent power for lighter shades.

II. Another desirable embodiment of our invention may comprise

| | Parts by weight |
|---|---|
| Dye | 4 |
| Ethyl ether of di-ethylene glycol | 5 |
| Methyl ether of ethylene glycol | 15 |
| Methanol | 40 |
| Denatured alcohol | 40 |

Deep shades can be obtained with this solution. At very high humidities however, its uses may occasion some tendency to fiber raising.

III. A mixture of

| | Parts by weight |
|---|---|
| Dye | 4 |
| Ether of ethylene glycol | 4 |
| Alcohol | 6 | gives a good material for general usage, being characterized by good solvent power and resistance to humidity in fiber-raising. As a solvent, this can also be desirably used to reduce or lighten this type of stain, with very satisfactory results.

Other modes of applying the principle of the invention may be employed, change being made as regards the details described, provided the ingredients stated in the following claim, or the equivalent of such, be employed.

We therefore particularly point out and distinctly claim as our invention:

A wood stain, which consists of about 4 parts of a water-soluble dye, about 5 parts of ethyl ether of diethylene glycol, about 80 parts of alcohol, and about 15 parts of methyl ether of ethylene glycol, all by weight.

CHARLES G. MOORE.
MILTON ZUCKER.